United States Patent [19]

Chang

[11] Patent Number: 5,096,265
[45] Date of Patent: Mar. 17, 1992

[54] FOLDING HAND TRUCK AUXILIARY WHEEL STRUCTURE

[76] Inventor: Chuan Chang, No. 133, Chang Nan Road, Sec. 5, Changhua, Taiwan

[21] Appl. No.: 713,090

[22] Filed: Jun. 11, 1991

[51] Int. Cl.⁵ .................. B60B 19/00; B60B 37/00
[52] U.S. Cl. ............................... 301/111; 301/1; 280/5.28; 280/43.1; 280/47.2
[58] Field of Search .......... 301/1, 111, 114, 124 R, 301/124 H, 128; 280/5.28, 43.1, 47.2

[56] References Cited

U.S. PATENT DOCUMENTS

| | | | |
|---|---|---|---|
| 3,499,658 | 3/1970 | Fernholz et al. | 280/47.2 |
| 3,499,659 | 3/1970 | Capadalis | 280/47.2 |
| 4,310,166 | 1/1982 | Eicher | 280/5.28 |
| 4,858,940 | 8/1989 | Cheng | 280/47.2 X |

Primary Examiner—Russell D. Stormer
Attorney, Agent, or Firm—Bacon & Thomas

[57] ABSTRACT

A folding hand truck auxiliary wheel structure comprising an U-shaped auxiliary wheel frame adjustably secured to the wheel frame of a folding hand truck by a stop plate and a U-shaped spring wire to hold a pair of auxiliary wheels, wherein the U-shaped auxiliary wheel frame has a plurality of pairs of pin holes symmetrically made on the two linked, elongated rods thereof along longitudinal direction; the stop plate has two curved portions spaced from each other for fastening the two linked, elongated rods of the U-shaped auxiliary wheel frame which have each a pin hole at an inner side. The auxiliary wheels are extended out and fixedly set at a level below the wheels on the wheel frame of the folding hand truck to which the auxiliary wheel structure is attached when the two opposite ends of the U-shaped spring wire are respectively fastened through the pin holes on the stop plate into the first pair of pin holes on the U-shaped auxiliary wheel frame, or received back into an idle position when the two opposite ends of the U-shaped spring wire are fastened into the last pair of pin holes on the U-shaped auxiliary wheel frame.

2 Claims, 6 Drawing Sheets

FOLDING HAND TRUCK AUXILIARY WHEEL STRUCTURE

BACKGROUND OF THE INVENTION

1. Field of the Invention

The present invention relates to a wheel structure and relates more particularly to an auxiliary wheel structure for attaching to the wheel frame of a folding hand truck at the back, which can be pulled out to match with the wheels of the folding hand truck to which it is attached for stair climbing operation, or pushed back into an idle position.

2. Description of Prior Art

Various types of hand trucks have been disclosed for moving heavy loads. A hand truck to which the present invention pertains generally comprises a L-shaped frame body having a wheel frame with wheels controlled by a handle to move a shelf to carry loads. The L-shaped frame body may be made in a folding structure so that it can be folded up into a collapsed arrangement to reduce space occupation when it is not in use. This type of folding hand truck is very helpful to travelers, more particularly to those commercial travelers. This structure of folding hand truck is very practical for use to move heavy loads on a smooth ground, however, it is not satisfactory in use for stair climbing operation. While passing through a stepped ground surface or climbing over stairs, a hand truck may be caused to overturn and the loads thereon may drop here and there. Further, this structure of folding hand cart is equipped with one pair of wheels transversely aligned. Therefore, it must be held in position by the hand after loading. Releasing of hands from the handle of a hand truck after loading immediately causes a hand truck to overturn.

SUMMARY OF THE INVENTION

The present invention has been accomplished to eliminate the aforesaid problems. It is therefore an object of the present invention to provide an auxiliary wheel structure for a folding hand truck which supports a folding hand truck to climb over stairs.

It is another object of the present invention to provide an auxiliary wheel structure for a folding hand truck which supports a folding hand truck to firmly stand up on the ground.

It is still another object of the present invention to provide an auxiliary wheel structure for a folding hand truck which can be conveniently adjusted into a working position to support and move a folding hand truck or completely received into an idle position.

To achieve the above objects, there is provided an auxiliary wheel structure for a folding hand truck which comprises an U-shaped auxiliary wheel frame adjustably secured to the wheel frame of a folding hand truck a stop plate and a U-shaped spring wire to hold a pair of auxiliary wheels into a working or idle position. The U-shaped auxiliary wheel frame has a plurality of pairs of pin holes symmetrically made on the two linked, elongated rods thereof along longitudinal direction. The stop plate has two curved portions spaced from each other for fastening the two linked, elongated rods of said U-shaped auxiliary wheel frame which have each a pin hole at an inner side. The auxiliary wheels are extended out and fixedly set in a working position at a level below the wheels on the wheel frame of the folding hand truck to which the auxiliary wheel structure is attached when the two opposite ends of the U-shaped spring wire are respectively fastened through the pin holes on the stop plate into the top pair of pin holes on the U-shaped auxiliary wheel frame, or received back into an idle position when the two opposite ends of the U-shaped spring wire are fastened into the bottom pair of pin holes on the U-shaped auxiliary wheel frame.

BRIEF DESCRIPTION OF THE PREFERRED EMBODIMENT

The foregoing and other objects, features and advantages of the present invention will be best understood from the following description, the appended claims and the accompanying drawings in which:

DETAILED DESCRIPTION OF THE PREFERRED EMBODIMENT

Figure 1:
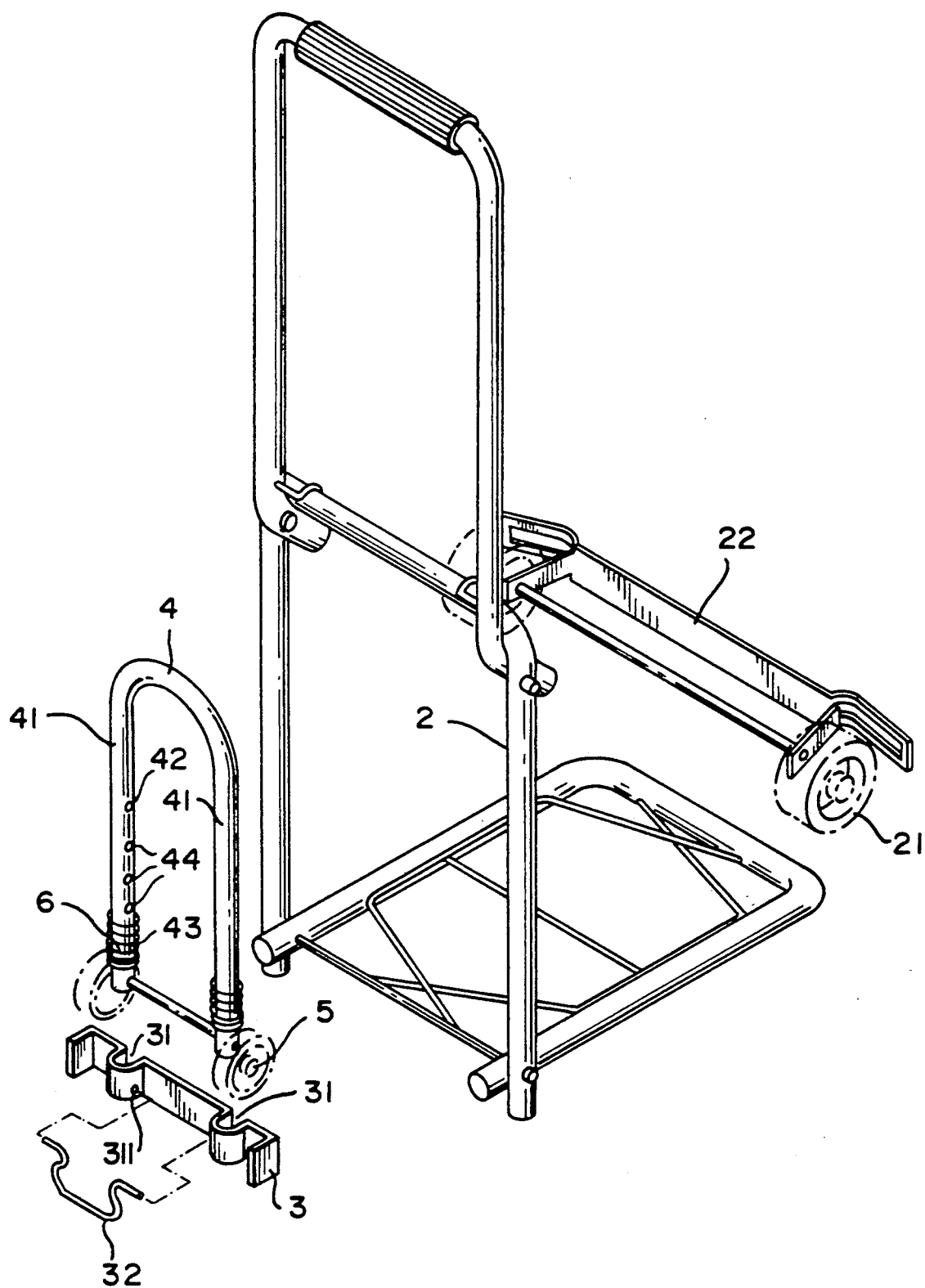
FIG. 1 is a dismantled perspective view of a folding hand truck constructed according to the present invention.
Figure 2:
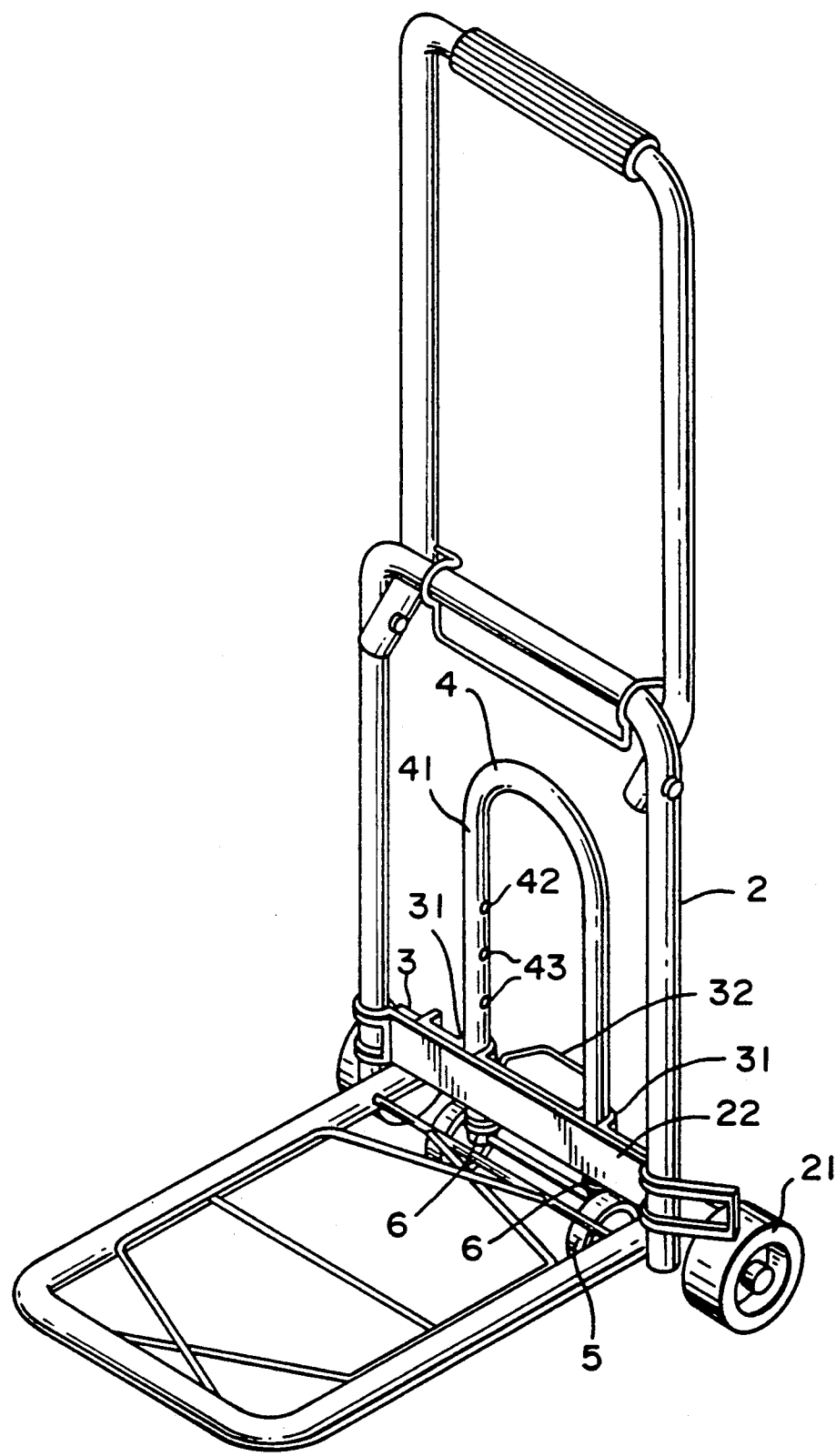
FIG. 2 is a perspective assembly view thereof.
Figure 3:
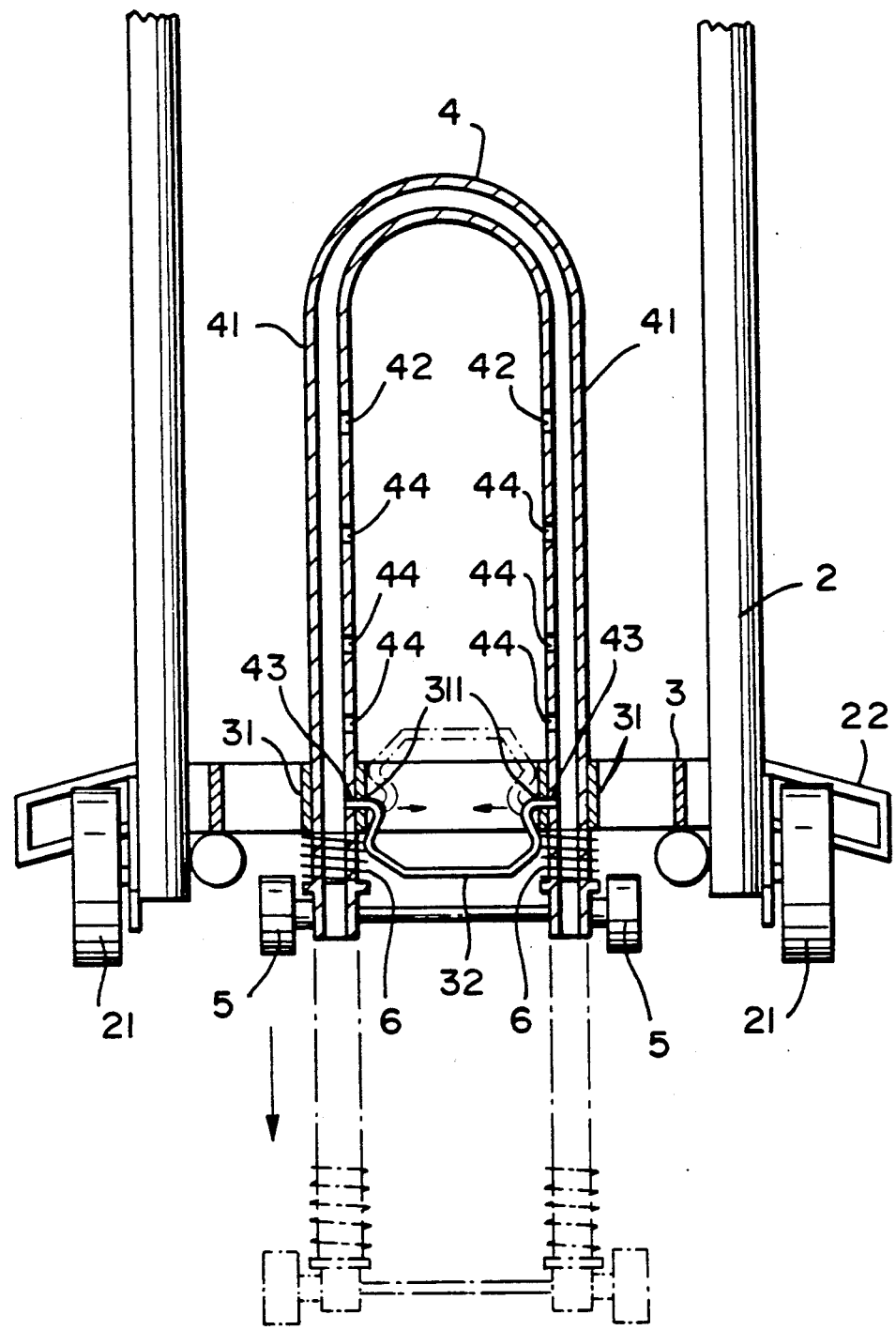
FIG. 3 is a sectional rear view thereof showing an operation to extend out the auxiliary wheels.

Referring to FIGS. 1, 2 and 3, there is illustrated a folding hand truck constructed in accordance with the present invention which has a wheel frame 22 transversely disposed at the bottom for holding two main wheels 21 at two opposite ends. The folding hand truck 2 further has a stop plate 3 transversely attached thereto at a back relative to the wheel frame 22, which stop plate 3 has two spaced, curved portions 31 respectively projecting outwards and defining therein a retaining hole each disposed in a vertical direction for holding an U-shaped wheel frame 4. The U-shaped wheel frame 4 comprises two unitary, elongated rods 41 with two auxiliary wheels 5 attached to the two opposite ends thereof, which auxiliary wheels 5 are relatively smaller than the main wheels 21 in outer diameter. The two unitary, elongated rods 41 of the U-shaped wheel frame 4 have each a plurality of pin holes at an inner side which include a first pin hole 42 at one end, a last pin hole 43 at an opposite end and a plurality of intermediate pin holes 44 therebetween. There are also provided two spring coils 6 respectively mounted on the two unitary, elongated rods 41 of the U-shaped wheel frame 4. During assembly, the two unitary, elongated rods 41 are respectively inserted through the two retaining holes defined within the two curved portions 31 permitting the two spring coils 6 respectively stopped between the auxiliary wheels 5 and the stop plate 3. Corresponding to the pin holes on the two unitary, elongated rods 41 of the U-shaped wheel frame 4, the stop plate 3 has two opposed pin holes 311 on the two curved portions 31 for fastening a U-shaped spring wire 32 to secure the U-shaped wheel frame 4 in position. By fastening the two opposite ends of the U-shaped spring wire 32 through the two pin holes 311 on the two curved portions 31 of the stop bar 3 into the two first pin holes 41 or the two last pin holes 43 on the two unitary, elongated rods 41 of the U-shaped wheel frame 4, the U-shaped wheel frame 4 is fixed at an upper limit position (as shown in the real line in FIG. 3) or a lower limit position (as shown in the dotted line in FIG. 3). Therefore, the position of the auxiliary wheels 5 relative to the main wheels 21 can be conveniently adjusted by changing the position of the U-shaped wheel frame 4 relative to the stop plate 3. The U-shaped spring wire 32 can be conveniently removed from the U-shaped wheel frame 4 by squeezing it inwards, and therefore, the position of the U-shaped wheel frame 4 relative to the stop plate 3 can be changed.

Figure 4:
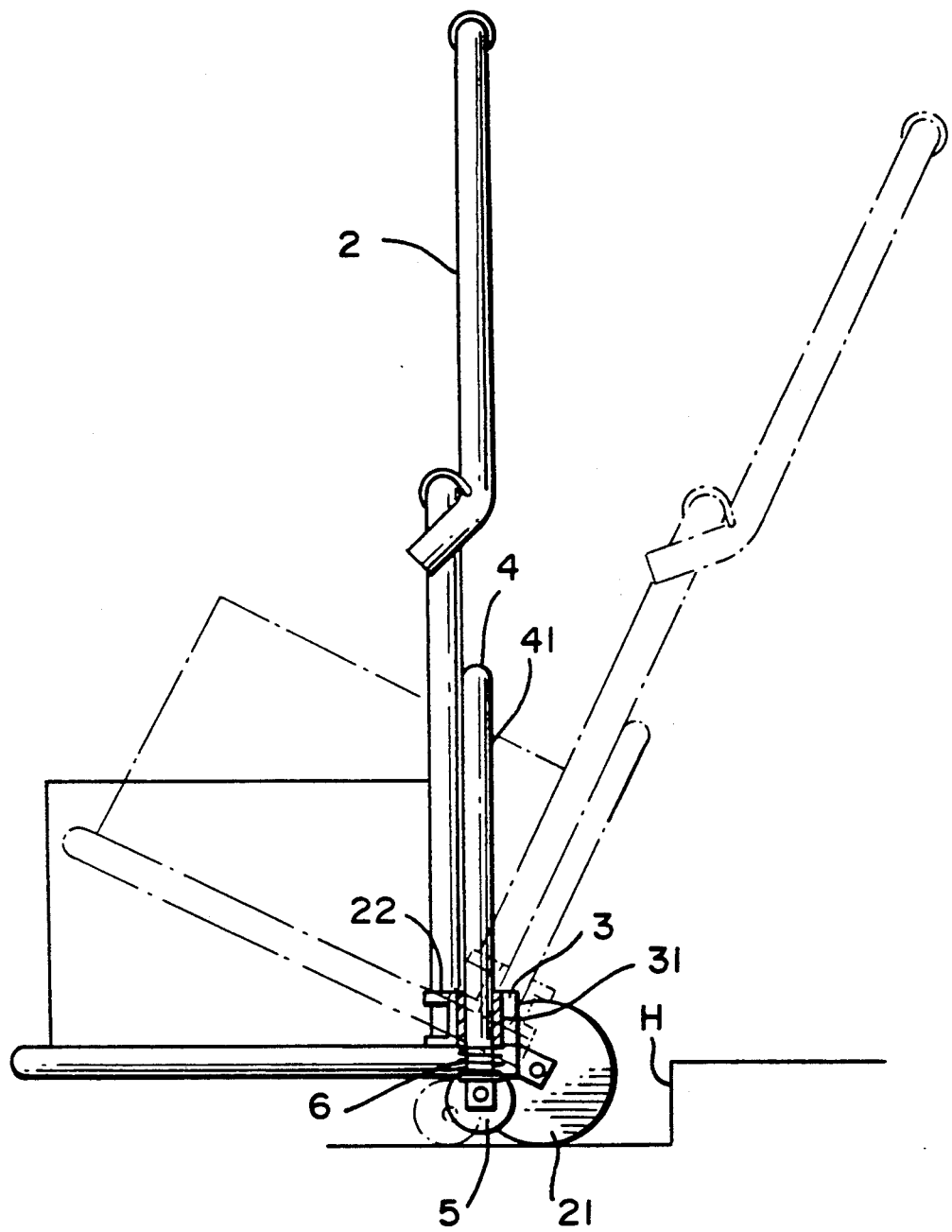
FIGS. 4 and 5 illustrate a process to move the hand truck over a stepped ground.

When the U-shaped wheel frame 4 is fixed at the upper limit position with the two last pin holes 43 on the two unitary, elongated rods 41 thereof respectively secured to the two pin holes 311 on the stop plate 3 by the U-shaped spring wire 32, the two auxiliary wheels 5 are disposed at a level above the bottom edge of the main wheels 21, i.e. the two auxiliary wheels 5 are lifted from the ground on which the two main wheels 21 are landed (see the real line in FIG. 4).

Figure 5:
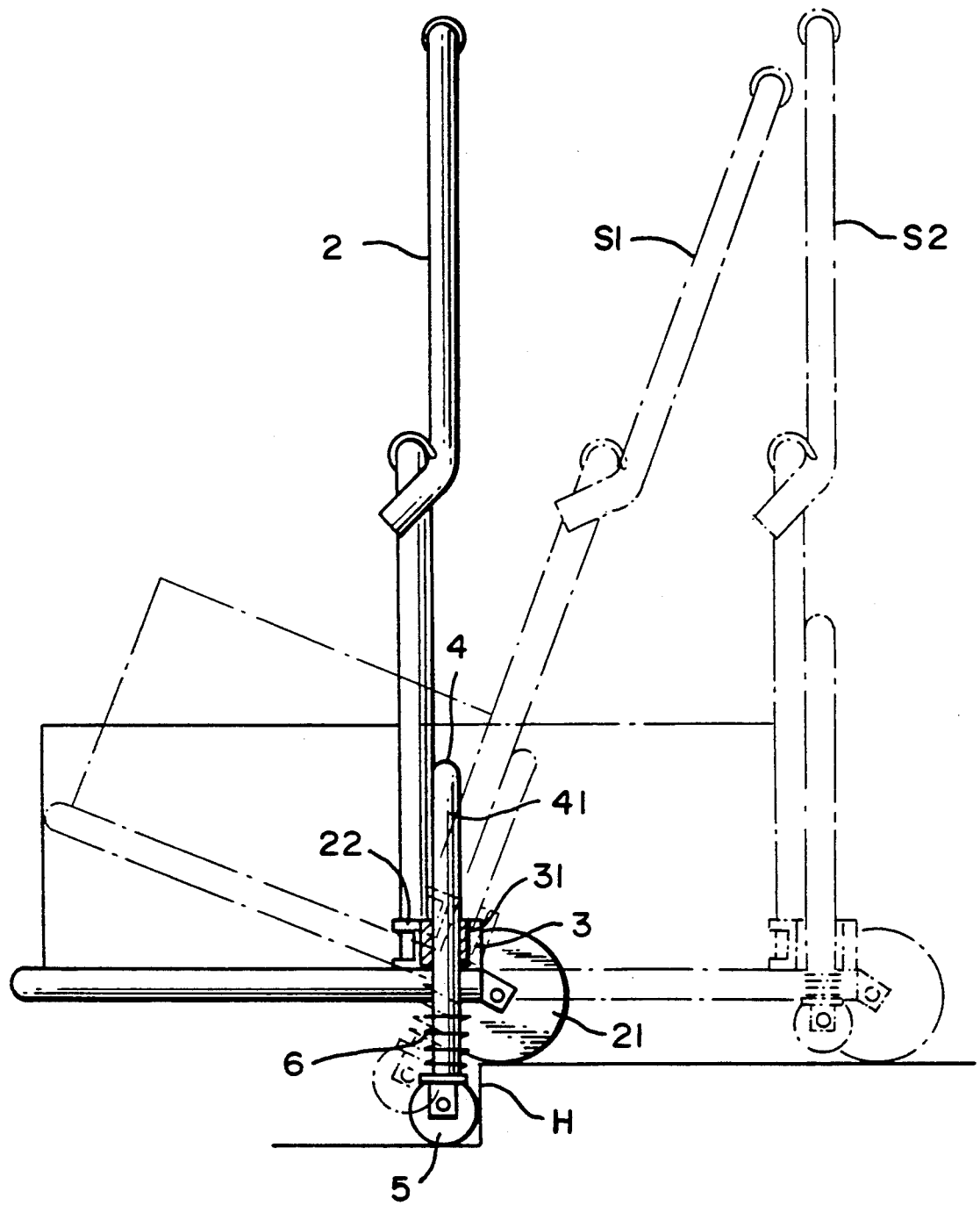

When moving over a riser H of the step ahead, the U-shaped wheel frame 4 is pushed out and fixed at the lower limit position by means of the control of the spring wire 32, permitting the auxiliary wheels 5 to be landed on the ground (as shown in the dotted line in FIG. 4). As soon as the auxiliary wheels 5 are fixed at a lower limit position to touch the ground, they are served as a fulcrum to support the folding hand truck permitting the main wheels 21 to be moved over the riser H and landed on the tread of the step ahead (as shown in the real line in FIG. 5). Then, the folding hand truck 2 is turned forward through a certain angle to become fully supported by the main wheels 21 permitting the auxiliary wheels 5 to be lifted from the ground (as shown in the dotted line S1 in FIG. 5). After passing over the riser H, the U-shaped wheel frame 4 is moved back to the upper limit position to fix the auxiliary wheels 5 at an idle status (as shown in the dotted line S2 in FIG. 5). Repeating the aforesaid procedure, the folding hand truck can be conveniently moved to climb over stairs.

Figure 6:
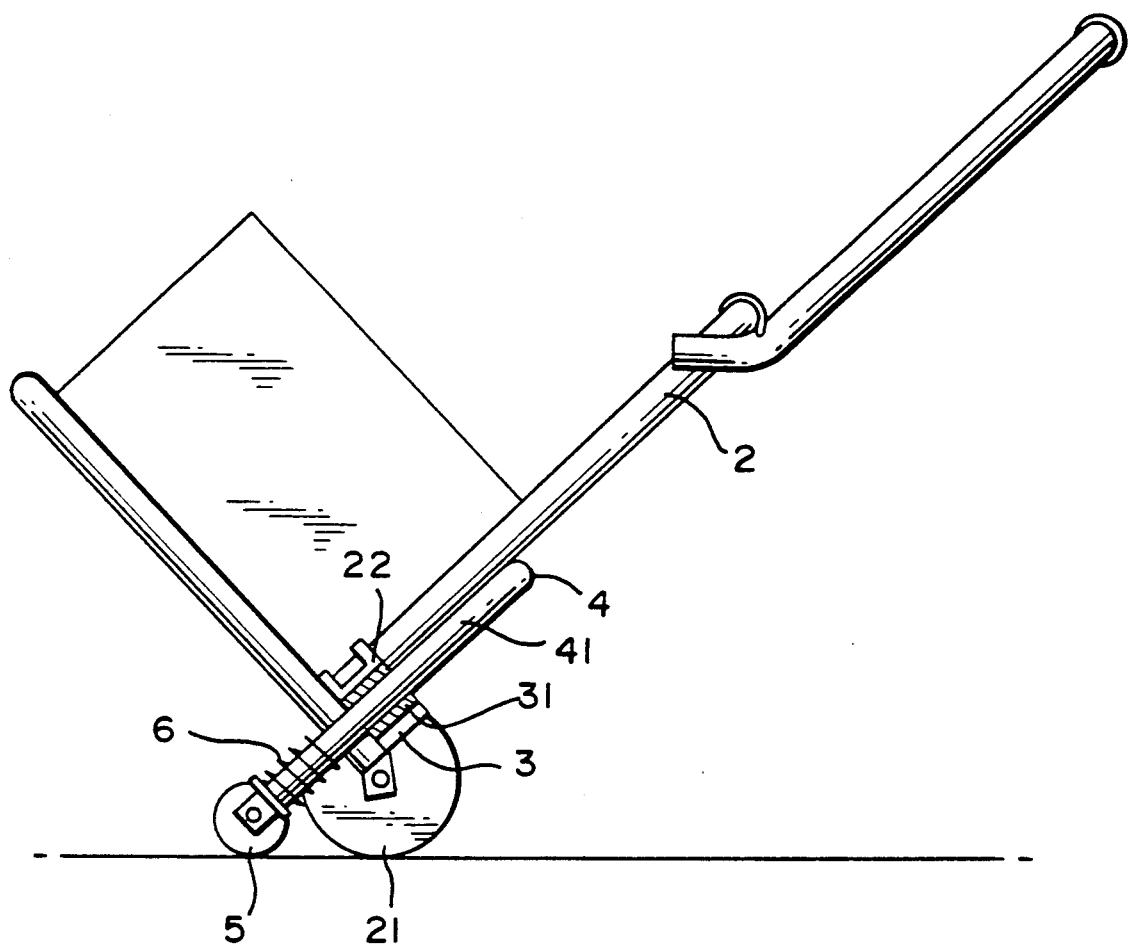
FIG. 6 illustrates that the hand truck is adjusted into another form with the auxiliary wheels simultaneously landed on the ground and moved to support the hand truck.

Referring to FIG. 6, the U-shaped wheel frame 4 may be fixed at or close to the lower limit position permitting the auxiliary wheels 5 as well as the main wheels 21 to simultaneously support the folding hand truck in a bevel position for carrying heavy load efficiently and conveniently. Under this arrangement, one's hands can be released from the folding hand truck while taking a rest, permitting it to be firmly supported by the main and auxiliary wheels 5 and 21.

Referring to FIGS. 1, 2 and 3 again, the intermediate pin holes 44 on the two unitary, elongated rods 41 of the U-shaped wheel frame 4 between the first and last pin holes 41 and 43 are provided for more choices while adjusting the position of the auxiliary wheels 5.

I claim:

1. For a folding hand truck of the type having a wheel frame with wheels controlled by a handle to support a shelf for carrying things, an auxiliary wheel structure comprising:

a stop plate attached to the wheel frame of a folding hand truck at the back, having two spaced, curved portions respectively projecting outwards relative to said wheel frame and defining therein a retaining hole each disposed in a vertical direction, said two spaced, curved portions having each a pin hole at an inner side relative to each other;

an U-shaped auxiliary wheel frame comprising two unitary, linked, elongated rods with two auxiliary wheels respectively revolvably secured thereto at two opposite ends, having a plurality of pairs of pin holes symmetrically made on said two linked, elongated rods at an inner side along longitudinal direction, said two auxiliary wheels being made in outer diameter smaller than the wheels on the wheel frame of the folding hand truck to which the auxiliary wheel structure is attached, said pairs of pin holes including at least a first pair of pin holes symmetrically disposed at the top and a last pair of pin holes symmetrically disposed at the bottom;

two spring coils respectively mounted on said two elongated rods of said U-shaped auxiliary wheel frame and retained between said stop plate and said auxiliary wheels;

a U-shaped spring wire having two opposite ends respectively inserted through the pin holes on said two spaced, curved portions of said stop plate into either pair of pin holes on said U-shaped auxiliary wheel frame; and wherein said auxiliary wheels are extended out and fixedly set at a level below the wheels on the wheel frame of the folding hand truck to which the auxiliary wheel structure is attached when the two opposite ends of said U-shaped spring wire are respectively fastened through the two pin holes on said two curved portions of said stop plate into said last pair of pin holes on said U-shaped auxiliary wheel frame; said auxiliary wheels are received back into an idle position and fixedly set at a level above the wheels on the wheel frame of the folding hand truck to which the auxiliary wheel structure is attached when the two opposite ends of said U-shaped spring wire are respectively fastened through the two pin holes on said two curved portions of said stop plate into said first pair of pin holes on said U-shaped auxiliary wheel frame.

2. The auxiliary wheel structure of claim 1, wherein the plurality of pairs of pin holes on said U-shaped auxiliary wheel frame further include at least one intermediate pair of pin holes between said first and last pairs of pin holes.

* * * * *